G. FLURY.
BELT FASTENER.
APPLICATION FILED APR. 18, 1918.
1,328,426.
Patented Jan. 20, 1920.
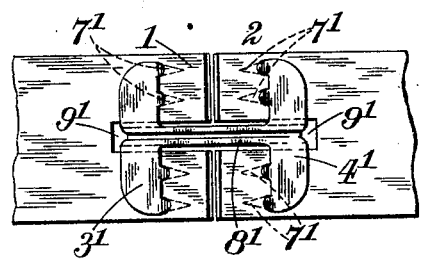
Inventor:
Georges Flury,

UNITED STATES PATENT OFFICE.

GEORGES FLURY, OF BIENNE, SWITZERLAND.

BELT-FASTENER.

1,328,426.  Specification of Letters Patent.  Patented Jan. 20, 1920.

Application filed April 18, 1918. Serial No. 229,293.

*To all whom it may concern:*

Be it known that I, GEORGES FLURY, a citizen of the Republic of Switzerland, residing at Ia Chemin de la Champagne, Bienne, Switzerland, have invented certain new and useful Improvements in Belt-Fasteners, of which the following is a specification.

This invention relates to fasteners for belts for power transmission and like purposes.

The fastener according to the invention is constituted by a piece of metal adapted to lie in contact with one face of the belt and comprising two similar transverse bars each provided with a single line of downwardly directed claws and connected together by a longitudinal central tie bar.

A fastener according to the invention is illustrated in the drawing.

In the drawing the fastener is shown in operative position connecting two belt ends 1 and 2. It consists of an H-shaped piece of metal, slightly curved in the longitudinal direction so that it lies in contact with one face of the belt. The claw carrying bars $3^1$ and $4^1$ are connected by the central tie bar $8^1$ which is of U-shaped cross-section, and the claws $7^1$ are curved and project downwardly into the belt. The tie bar lies in recesses $9^1$ cut in the belt ends.

When connecting together the belt ends 1 and 2, if care is taken to press the same so that they butt against each other, they will not readily disengage from the claws $7^1$ when the belt is not in tension.

The fastener according to the invention is simple and cheap to make, as it can be formed by stamping from sheet metal.

What I claim as my invention and desire to secure by Letters Patent is:—

1. A fastener for connecting together the ends of belting, constituted by a piece of metal adapted to lie in contact with one face of the belt and comprising two similar transverse bars each provided with a single line of downwardly directed claws and connected together by a longitudinal central tie bar.

2. A fastener for connecting together the ends of belting, constituted by an H-shaped member adapted to lie in contact with one face of the belt and the side elements of which are each provided with a single line of downwardly projecting claws while the central cross-member operates as a tie-bar when the claws on the two side elements enter respectively the two ends of the belting to be joined.

In testimony whereof I have signed my name to this specification in the presence of two subscribing witnesses.

GEORGES FLURY.

Witnesses:
  M. J. STEHLIN,
  CHEH BLINDE.